United States Patent
Tabatowski-Bush et al.

(10) Patent No.: US 10,978,903 B2
(45) Date of Patent: Apr. 13, 2021

(54) CELL SPECIFIC TRACTION BATTERY MONITORING

(71) Applicant: Ford Global Technologies, LLC, Dearborn, MI (US)

(72) Inventors: Benjamin A. Tabatowski-Bush, South Lyon, MI (US); Richard Mo, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 402 days.

(21) Appl. No.: 15/871,659

(22) Filed: Jan. 15, 2018

(65) Prior Publication Data
US 2019/0222056 A1   Jul. 18, 2019

(51) Int. Cl.
*H02J 7/34* (2006.01)
*H02J 7/00* (2006.01)
*B60L 58/12* (2019.01)

(52) U.S. Cl.
CPC .............. *H02J 7/345* (2013.01); *B60L 58/12* (2019.02); *H02J 7/0021* (2013.01); *B60L 2240/44* (2013.01); *Y10S 903/903* (2013.01)

(58) Field of Classification Search
None
See application file for complete search history.

(56) References Cited

U.S. PATENT DOCUMENTS

| | | | |
|---|---|---|---|
| 6,114,833 A | 9/2000 | Langston et al. | |
| 9,559,530 B2 | 1/2017 | Lee | |
| 2002/0190044 A1* | 12/2002 | Leisner | B23K 9/1006 219/133 |
| 2009/0016549 A1* | 1/2009 | French | H03G 3/004 381/120 |
| 2009/0105895 A1* | 4/2009 | Shige | B60W 10/26 701/22 |
| 2013/0124051 A1* | 5/2013 | Sievers | H02J 7/345 701/45 |
| 2016/0352130 A1 | 12/2016 | Zhang et al. | |
| 2017/0057372 A1* | 3/2017 | Loftus | B60L 58/24 |

FOREIGN PATENT DOCUMENTS

CN        104215823 A       12/2014

* cited by examiner

*Primary Examiner* — Jared Fureman
*Assistant Examiner* — Aqeel H Bukhari
(74) *Attorney, Agent, or Firm* — David B. Kelley; Brooks Kushman P.C.

(57) ABSTRACT

A vehicle includes a traction battery, circuitry including a switch and a capacitor, and a monitoring chip configured to draw power from a cell of the traction battery via the circuitry responsive to the switch being closed. The circuitry is configured to open the switch to disconnect the cell from the chip and power the chip via the capacitor for a predetermined period. Powering the chip via the capacitor prevents power down of the chip during the predetermined period. The circuitry opens the switch responsive to engine cranking.

19 Claims, 3 Drawing Sheets

CELL SPECIFIC TRACTION BATTERY MONITORING

TECHNICAL FIELD

The present disclosure relates to cell specific monitoring of traction batteries.

BACKGROUND

Engine cranks and other high current draws cause cell voltage of traction battery packs to drop. Cell voltage may be measured and powered by the same circuit. As cell voltage drops, measurement of the cell voltage may be erroneous or unavailable.

SUMMARY

A vehicle includes a traction battery, circuitry including a switch and a capacitor, and a monitoring chip configured to draw power from a cell of the traction battery via the circuitry responsive to the switch being closed. The circuitry is configured to open the switch to disconnect the cell from the monitoring chip and power the chip via the capacitor for a predetermined period. Powering the chip via the capacitor prevents power down of the chip during the predetermined period. The circuitry opens the switch responsive to engine cranking. The monitoring chip may be further configured to indicate that the cell is defective. The indication may be responsive to a voltage falling below a threshold. The switch may be a transistor. The transistor may be controlled by a voltage divider circuit of the circuitry. The circuitry may be further configured to place the transistor in cutoff operation. The cutoff position may be responsive to a voltage of the cell falling below a threshold. The capacitor may be an MLCC capacitor that decouples the cell and the chip. A time constant associated with the capacitor may be less than predetermined engine cranking time.

A method includes drawing power from a cell of a traction battery pack via circuitry. The power draw is responsive to a switch of the circuitry being closed. The method further includes opening the switch to disconnect the cell from a monitoring chip and powering the chip via a capacitor of the circuitry for a predetermined period to prevent power down of the chip during the predetermined period. The opening of the switch is responsive to engine cranking. The method may further include, responsive to the voltage falling below a threshold, indicating that the cell is defective. The current demand may result from engine cranking. The transistor may be controlled by a voltage divider circuit. The capacitor may be an MLCC capacitor that decouples the cell and the chip. A time constant associated with the capacitor may be less than predetermined engine cranking time.

A method includes drawing power from a cell of a traction battery pack via circuitry. The power drawn is responsive to a switch of the circuitry being closed. The method further includes opening the switch to disconnect the cell from a monitoring chip and powering the chip via a capacitor of the circuitry for a predetermined period to prevent power down of the chip during the predetermined period. The opening is responsive to engine cranking. The method may further include, responsive to the voltage falling below a threshold, indicating that the cell is defective. The circuitry may include a transistor configured to isolate the cell when energy from the cell falls below a cell threshold. The transistor may be controlled by a voltage divider circuit. The capacitor may be an MLCC capacitor that decouples the cell and the chip. A time constant associated with the capacitor may be less than a predetermined engine cranking time.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A battery pack sensing module (BPSM) is configured to measure cell voltage of a traction battery pack. The BPSM is configured to transmit the sensed data to a vehicle controller. The BPSM may be powered by the cell it is measuring. During engine starts or cranks, the cell voltage may drop below the voltage required for the BPSM because high current is required to turn the engine. In order to prevent a loss of the BPSM, circuitry may be configured to maintain the power required by the BPSM for voltage measurement during the engine crank. The loss of monitoring could require the vehicle to be shutdown in response to a loss in monitoring.

The circuitry may include transistors, capacitors, and resistors. The circuitry may include transistors having different doping schemes and the transistors may be configured to act as a switch to connect and disconnect the cell and to connect a capacitor. Resistors may be used to control the switch voltage to determine whether to disconnect the cell and connect the capacitor, providing a selectable disconnect switch based on a voltage of the cell such that when the engine crank occurs, the cell is disconnected from monitoring.

Figure 1:
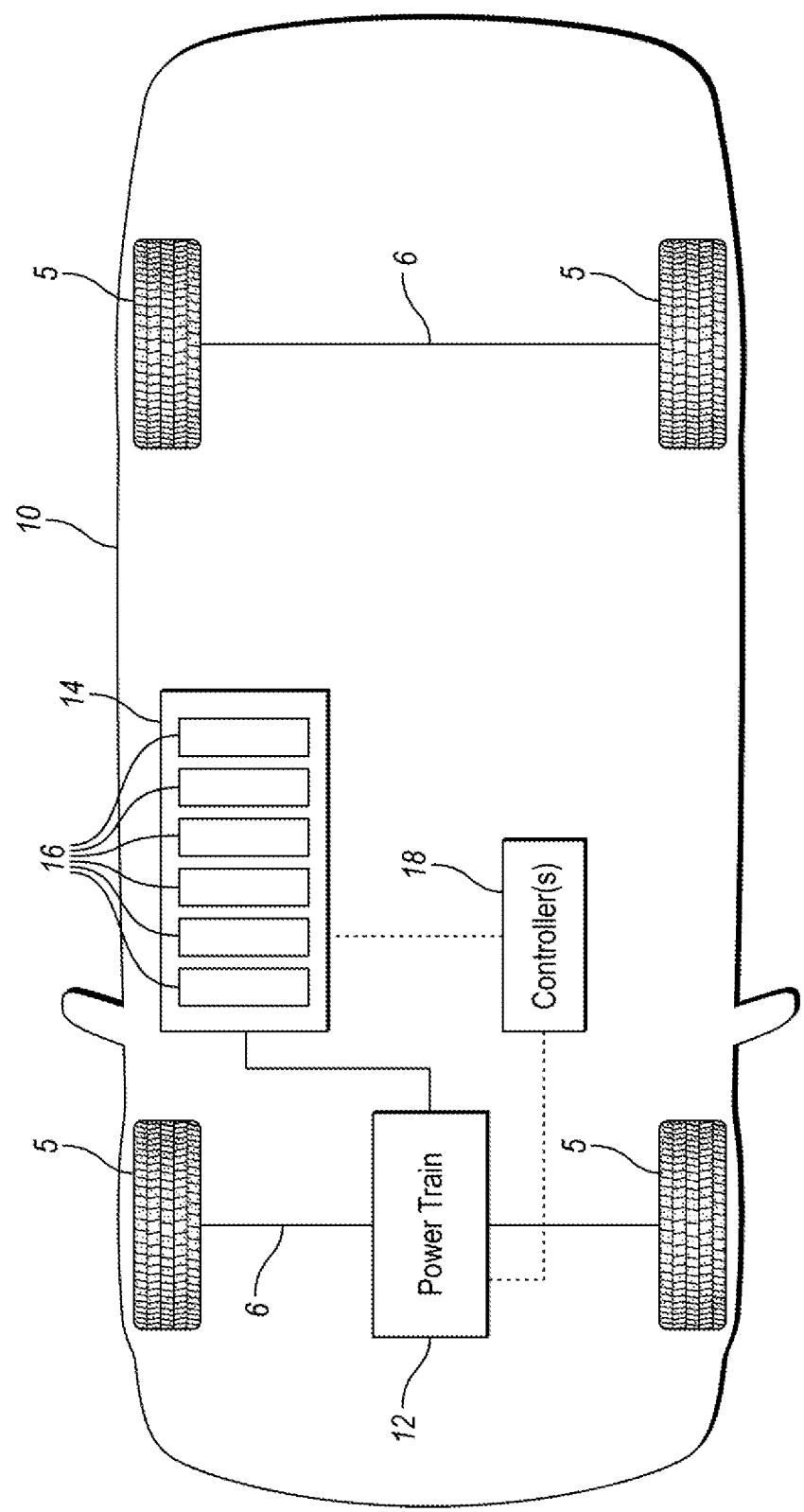
FIG. 1 is a top view of a vehicle having a battery pack and individual cells.

Referring to FIG. 1, a vehicle 10 is shown. The vehicle 10 includes a set of wheels 5 and front and rear axles 6. The vehicle includes a powertrain 12. The powertrain may include an internal combustion engine, at least one traction motor, and other electric machines. The powertrain 12 may further include inverters and voltage regulators. The traction motor and electric machines of the powertrain 12 is powered by a traction battery pack 14.

The traction battery pack 14 includes individual cells 16 aggregated to provide sufficient voltage and current to the powertrain 12. The traction battery pack 14 and powertrain 12 are monitored and controlled by controllers 18 ensure proper operation. It should be appreciated that other powertrain and battery pack configurations may be employed. For example, the battery pack may be unitary or disperse throughout the vehicle.

Figure 2:
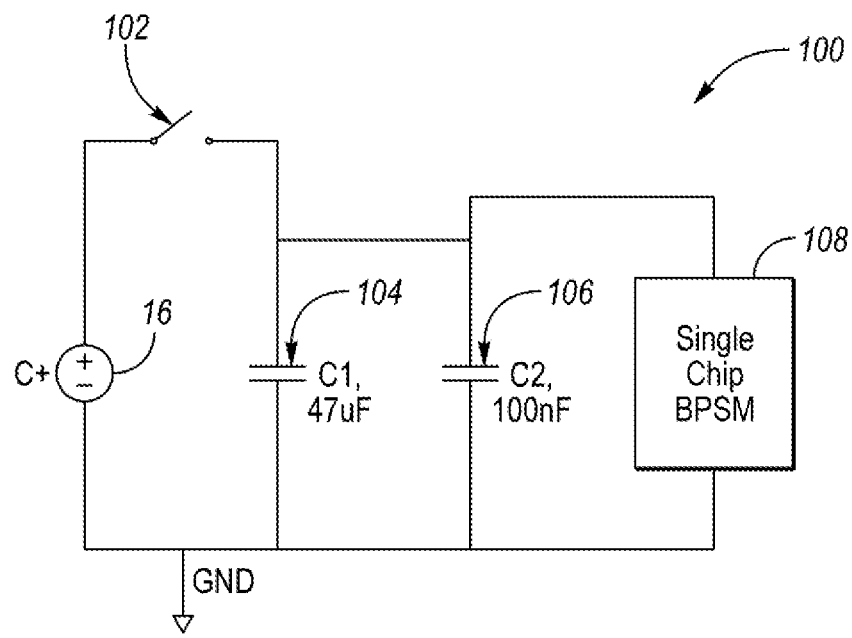
FIG. 2 is a schematic of circuitry including a battery cell sensing module and a switch.

Referring to FIG. 2, circuitry 100 including a switch 102 and a dropout capacitor 104 is shown. The decoupling capacitor 106 is used for decoupling the monitoring chip 108 and the other circuitry. In some embodiments, the decoupling capacitor 106 may be combined with dropout capacitor 104 in an MLCC capacitor. The decoupling capacitor 106 may also be a choke. The dropout capacitor 104 may be other energy storage devices. For example, the dropout capacitor 104 may be an electrochemical battery, a fuel cell, or other implement. The function of the capacitor is to maintain the voltage of the single chip BPSM while the switch 102 is open.

The circuitry 100 is connected to a cell 16 of the traction battery pack 14 and a monitoring chip or BPSM 108. As an example, in a hybrid electric vehicle, the controller 18 may require an automatic engine start in response to a state of charge (SOC) of the battery pack 14 falling below an engine start threshold. The battery pack may have a low voltage because battery pack output voltage typically coincides with battery pack SOC. Therefore, the engine start may drop an already low voltage level below the voltage required for measurement and power of the monitoring chip 108.

As the voltage drops, during the engine crank, the pass switch 102 will open and the monitoring chip 108 will temporarily be powered by the dropout capacitor 104. As described below the dropout capacitor 104 may be sized to ensure the voltage is maintained during the entire engine start event. For example, the time constant associated with the circuit and the capacitor such that the capacitor is sized to last for an entire engine crank cycle.

Figure 3:
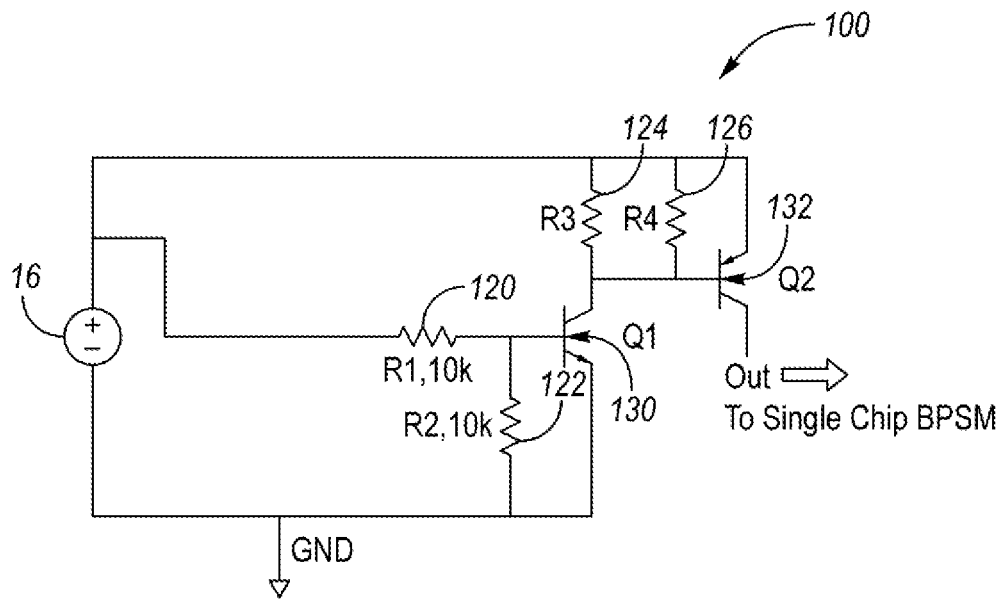
FIG. 3 is a schematic of switching circuitry including transistors.

Referring to FIG. 3, the switch 102 and associated circuitry is shown. Switch 102 may have other circuitry configurations to provide a disconnection from the cell 16 during engine starts. As shown the switch 102 and associated circuitry includes two transistors 130, 132. The transistors may be any type (e.g., MOSFET, BJT) and be comprised of any material (e.g., Silicon, Germanium). The circuitry includes four resistors 120, 122, 124, 126. The resistors may be any type (e.g., carbon, film).

The NPN-PNP combination of transistors 130, 132 will disconnect the output of transistor 132 to the monitoring chip 108 of FIG. 2 when the cell 16 voltage is below a predetermined threshold, where transistor 130 is an NPN transistor and transistor 132 is a PNP transistor. If resistors 120, 122 are sized similarly (e.g., 10 kΩ) transistor 130 will turn off when the cell voltage is between 1.0 V and 2.0 V. Preferably the transistor 130 will turn off when the cell voltage is less than 1.4 V. The resistors 120, 122 may be adjusted to change the 1.4 V threshold. Further, the base of transistor 132 will be pulled high and thus will turn off the output from transistor 132 to the monitoring chip 108. As the cell 16 voltage returns—and as the current draw from the engine crank subsides—transistor 130 will turn on when the cell voltage is above the 1.4 V threshold. Meaning, the resistors 120, 122 may be configured to ensure the BPSM 108 is powered by the capacitor 104 when the cell 16 voltage drops below a predetermined value.

The controller 18 of FIG. 1 may further be configured to selectively enable the BPSM through the switch 102 and associated circuitry. Additional transistors may be configured to enable or disable the circuit on command, similar to transistor 130. As shown in FIG. 3, the base of transistor 130 is connected to the cell 16. The base of 130 or another transistor may be connected to the controller 18 to selectively disconnect the cell from the monitoring chip to prevent leakages and unnecessary current drain.

Figure 4:
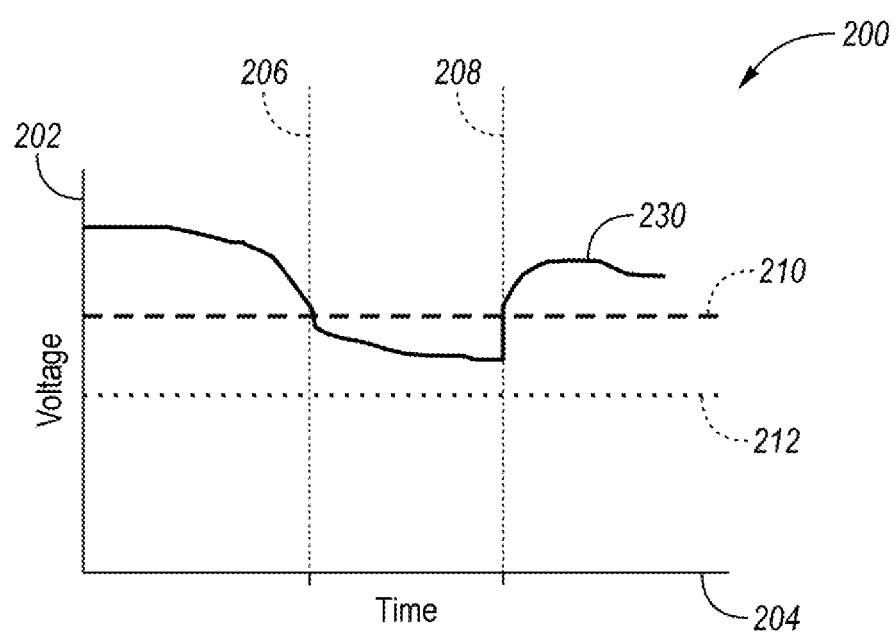
FIG. 4 is a graph of circuitry voltage.

Referring to FIG. 4, a graph 200 is shown. The graph 200 depicts cell voltage 202 over time 204. The graph 200 includes curve 230. The switch 102 and associated circuitry 100 can be configured to remove the monitoring chip 108 from the cell 16 such that the falling voltage does not cross the monitoring chip 108 threshold 212, as shown by curve 230. Curve 230 shows that after the engine crank at time 206, the voltage is maintained because of capacitor 104. As soon as voltage 230 drops below voltage threshold 210, the transistor 130 cuts off the switch 102 and associated circuitry (i.e., opens the switch) such that the cell 16 is no longer electrically connected to the monitoring chip 108. The monitoring chip 108 is powered by the capacitor 104 until the engine crank is complete at time 208. As shown, the cell voltage returns above the voltage threshold 210 after the engine crank. The monitoring chip 108 may be configured such that if power is lost, the cell 16 will be designated as defective to the controller 18 because the cell 16 is unable to provide the requisite voltage even though the engine is not cranking.

The processes, methods, logic, or strategies disclosed may be deliverable to and/or implemented by a processing device, controller, or computer, which may include any existing programmable electronic control unit or dedicated electronic control unit. Similarly, the processes, methods, logic, or strategies may be stored as data and instructions executable by a controller or computer in many forms including, but not limited to, information permanently stored on various types of articles of manufacture that may include persistent non-writable storage media such as ROM devices, as well as information alterably stored on writeable storage media such as floppy disks, magnetic tapes, CDs, RAM devices, and other magnetic and optical media. The processes, methods, logic, or strategies may also be implemented in a software executable object. Alternatively, they may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   an internal combustion engine configured to drive wheels of the vehicle;
   an electric machine configured to drive the wheels;
   a traction battery configured to power the electric machine;
   circuitry including a switch and capacitor; and
   a chip configured to draw power from a cell of the traction battery via the circuitry responsive to the switch being closed, the circuitry being configured to, responsive to cranking of the internal combustion engine, open the switch to disconnect the cell from the chip and power the chip via the capacitor for a predetermined period to prevent power down of the chip during the predetermined period.

2. The vehicle of claim 1, wherein the monitoring chip is further configured to, responsive to a voltage falling below a threshold, indicate that the cell is defective.

3. The vehicle of claim 1, wherein the switch is a transistor.

4. The vehicle of claim 3, wherein the transistor is controlled by a voltage divider circuit of the circuitry.

5. The vehicle of claim 3, wherein circuitry is further configured to, responsive to a voltage of the cell falling below a threshold, place the transistor in cutoff operation.

6. The vehicle of claim 1, wherein the capacitor is an MLCC capacitor that decouples the cell and the chip.

7. The vehicle of claim 1, wherein a time constant associated with the capacitor is less than predetermined engine cranking time.

8. A method comprising:
   responsive to a switch of circuitry being closed, drawing power from a cell of a traction battery pack via the circuitry, wherein the traction battery pack is configured to power an electric machine and wherein the electric machine is configured to drive wheels of a vehicle; and
   responsive to current demand on the traction battery pack exceeding a threshold, opening the switch to disconnect the cell from a monitoring chip and powering the chip via a capacitor of the circuitry for a predetermined period to prevent power down of the chip during the predetermined period.

9. The method of claim 8 further comprising responsive to the voltage falling below a threshold, indicating that the cell is defective.

10. The method of claim 8, wherein the current demand results from engine cranking.

11. The method of claim 10, wherein the transistor is controlled by a voltage divider circuit.

12. The method of claim 8, wherein the capacitor is an MLCC capacitor that decouples the cell and the chip.

13. The method of claim 8, wherein a time constant associated with the capacitor is less than predetermined engine cranking time.

14. A method comprising:
   responsive to a switch of circuitry being closed, drawing power from a cell of a traction battery pack via the circuitry, wherein the traction battery pack is configured to power an electric machine and wherein the electric machine is configured to drive wheels of a vehicle; and
   responsive to engine cranking, opening the switch to disconnect the cell from a monitoring chip and powering the chip via an energy storage device of the circuitry for a predetermined period to prevent power down of the chip during the predetermined period.

15. The method of claim 14 further comprising, responsive to the voltage falling below a threshold, indicating that the cell is defective.

16. The method of claim 14, wherein the circuitry includes a transistor configured to isolate the cell when energy from the cell falls below a cell threshold.

17. The method of claim 16, wherein the transistor is controlled by a voltage divider circuit.

18. The method of claim 14, wherein the capacitor is an MLCC capacitor that decouples the cell and the chip.

19. The method of claim 14, wherein a time constant associated with the capacitor is less than a predetermined engine cranking time.

* * * * *